Nov. 29, 1966 R. H. SHUMATE 3,289,082

PHASE SHIFT DATA TRANSMISSION SYSTEM
WITH PHASE-COHERENT DATA RECOVERY

Filed May 31, 1963 8 Sheets-Sheet 1

INVENTOR:
ROBERT H. SHUMATE,
BY David Blumenfeld
HIS ATTORNEY.

INVENTOR:
ROBERT H. SHUMATE,
BY David Blumenfeld
HIS ATTORNEY.

Nov. 29, 1966 R. H. SHUMATE 3,289,082

PHASE SHIFT DATA TRANSMISSION SYSTEM WITH PHASE-COHERENT DATA RECOVERY

Filed May 31, 1963 8 Sheets-Sheet 3

INVENTOR:
ROBERT H. SHUMATE,

BY David Blumenfeld
HIS ATTORNEY.

INVENTOR:
ROBERT H. SHUMATE,
BY David Blumenfeld
HIS ATTORNEY.

INVENTOR:
ROBERT H. SHUMATE,
BY David Blumenfeld
HIS ATTORNEY.

Nov. 29, 1966 R. H. SHUMATE 3,289,082
PHASE SHIFT DATA TRANSMISSION SYSTEM
WITH PHASE-COHERENT DATA RECOVERY
Filed May 31, 1963 8 Sheets-Sheet 6

INVENTOR:
ROBERT H. SHUMATE,
BY J. David Blumenfeld
HIS ATTORNEY.

INVENTOR:
ROBERT H. SHUMATE,
BY [signature]
HIS ATTORNEY.

INVENTOR:
ROBERT H. SHUMATE,
BY David Blumenfeld
HIS ATTORNEY.

3,289,082
PHASE SHIFT DATA TRANSMISSION SYSTEM WITH PHASE-COHERENT DATA RECOVERY

Robert Hanger Shumate, Forest, Va., assignor to General Electric Company, a corporation of New York Filed May 31, 1963, Ser. No. 284,395
11 Claims. (Cl. 325—30)

This invention relates to an apparatus for transmitting data in a digital form over a communication medium and for receiving the same and recovering the information thus transmitted.

In transmitting digital data between two geographically remote locations, as might be the case if information is to be transmitted between two data processing centers each of which includes computers and tape transports and the like, the digital data which is usually in binary or some other coded form, must be modulated onto some suitable carrier, transmitted over a transmission medium, and the data recovered at the receiver with a minimum of errors. Such a system is described and claimed in a concurrently filed application S.N. 284,635, filed May 3, 1963 in the name of Floyd B. Robbins entitled Data Transmission System, and assigned to the assignee of the present invention.

The problem is particularly severe with the transmission of data since in any Data System absolute phase coherence between the transmitter and receiver must be achieved in order to eliminate errors in recovering the data. Thus, for example, when double sideband, suppressed carrier transmission is utilized, the received signal must be demodulated by the reinsertion of the carrier frequency from a local oscillator source. Unlike voice transmission it is not enough that the local oscillator is frequency locked with the transmitter carrier. Absolute phase coherence between the local oscillator and the transmitter frequency is necessary, since the local oscillator can lock in at the same frequency as the transmitter carrier but in two different phase positions, zero or 180 degrees phase relationship. This phase ambiguity can have catastrophic results in a system for transmitting binary data. If the local oscillator happens to lock in at the transmitter carrier frequency, the recovered data will be an exact reproduction of the binary information fed to the modulator at the transmitter end of the system, but if the local oscillator happens to lock in at the carrier frequency but 180 degrees out of phase, the recovered data will be completely erroneous because every Binary One at the transmitter end will be recovered as a Binary Zero and every Binary Zero will be recovered as a Binary One. This is, of course, a completely unacceptable situation and some means must be provided for insuring that a local oscillator at the receiver always locks in at the frequency and phase which is identical with the transmitter carrier.

It is, therefore, one of the primary objects of this invention to provide a system for transmitting digital data between two points wherein the receiver always maintains exact phase coherence with the carrier at the transmitter.

Another object of this invention is to provide a receiver for a data transmission system wherein the receiver local oscillator is controlled to maintain exact frequency and phase coherence between the local oscillator signal and the carrier signal at the transmitter.

In addition to maintain exact phase coherence between the local oscillator and the transmitter carrier in order to insure proper recovery of the data, the wave form of the binary data is often seriously deteriorated during transmission and must be reconstituted in order to be useful at the data processing location and equipment.

It is, therefore, yet another object of this invention to provide a system for transmitting and receiving digital data wherein the received data has its wave form reconstituted.

Other objects and advantages of the invention will become apparent as the description thereof proceeds.

In one form of the invention, all of the objects are achieved by transmitting binary data in double sideband, suppressed carrier form with a tone or control signal at the clock frequency being transmitted along with the data. At the receiver, the signal is demodulated in an In Phase and in a Quadrature Demodulating Channel. The tone frequency at the clock pulse rate is filtered out to determine the relationship of the local carrier at the receiver to the transmitter carrier frequency. The presence or absence of the tone signal in the quadrature channels is indicative of the desired frequency relationship of the two signals. The presence of the tone signal in the Quadrature Channel is used to generate a control signal which controls the frequency of the local oscillator.

In addition, a Phase Ambiguity Correcting Circuit is provided which senses whether the local oscillator is in phase with the transmitted carrier or 180 degrees out of phase with that carrier. This is achieved by sampling the zero crossings of the data and comparing them with the clock pulses to determine during which half of the clock pulse the data crossings occur. If they occur during the positive half of the clock pulses, the local oscillator is in phase with the transmitted carrier and if they occur during the negative portions of the clock pulses, the local oscillator frequency is 180 degrees out of phase with the transmitter carrier frequency. In that case, a control signal is produced which disables the local oscillator for a sufficient period of time to invert its phase and produce a carrier signal for application to the demodulators which is in phase with the transmitter carrier signal.

The data character signals from the demodulator are also treated in a data recovery circuit wherein the wave form of the data is reconstituted to produce the desired steep wave front rectangular pulses representative of the Binary Code. To this end, the deteriorated wave form is integrated and the integrating circuit discharged by a switch operated at the clock frequency. The discharge of the integrator produces a steep wave front which is utilized to trigger a Flip Flop which produces the desired steep wave front rectangular pulses which are then transmitted to the computer and other utilization equipment.

The novel features which are believed to be characteristic of this invention are set forth with particularity in the appended claims. The invention itself, however, both with further objects and advantages thereof may best be understood by reference to the following description taken in connection with the accompanying drawings, in which:

THE MODULATOR

Figure 1:
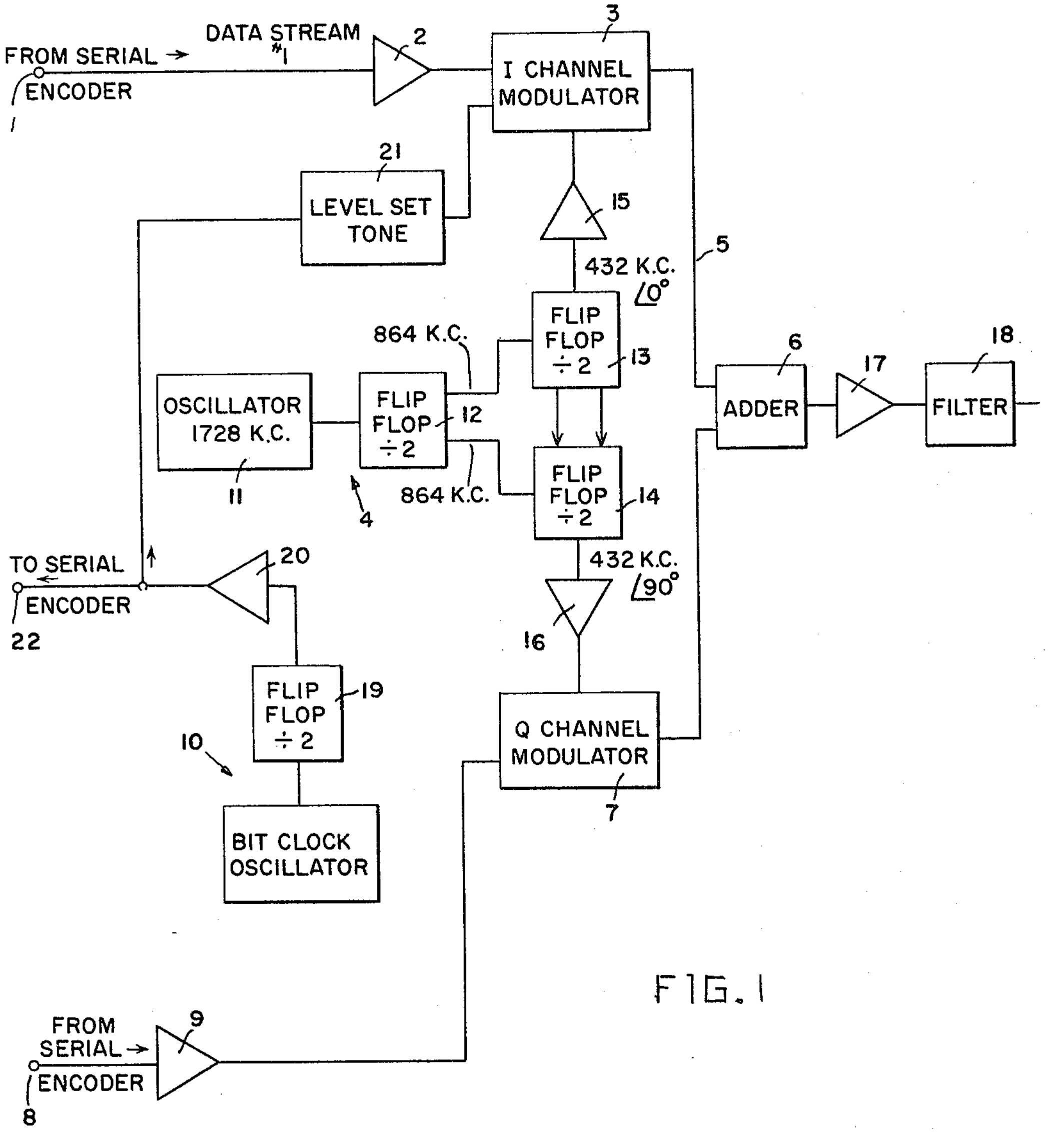
FIG. 1 is a schematic, in block diagram form, of the modulator and transmitter which receives a serial bit stream and modulates it onto a carrier for transmission over a communication medium.

The Modulator, shown in FIG. 1, takes the two serial bit streams from any source such as the Serial Encoder described in connection with the copending application S. N. 284,635 and modulates them separately onto two carriers for transmission over the communication medium which may be microwave, or R-F, or cable link, etc. The two synchronized serial bit streams are separately modulated onto two carriers which are of the same frequency but of ninety degree (90°) phase difference. The individual ONE and ZERO bits change the carrier phase by one hundred eighty degrees (180°). That is, the phase of the carrier for a one bit is one hundred eighty degrees (180°) different from the carrier phase for a ZERO bit. The two modulated carriers, which are double sideband, suppressed carrier signals, are added algebraically into one wave form for transmission. The output signal takes one of four possible phase positions, depending on the four possible combinations of ONES and ZEROES, 11, 10, 00, 01. The output signal, which is the vector sum of the two modulated carriers, therefore, contains information about two bits, one in each of the two bit streams applied to the Modulator.

Thus, a first bit stream is impressed on Input Terminal 1, amplified in Amplifier 2 and applied to the input of a Balanced Modulator 3 identified by the legend "I" Channel Modulator. A carrier signal from a Local Oscillator indicated generally at 4 is applied to Modulator 3 and is modulated by the individual bits by shifting its phase between zero and one hundred eighty degrees (180°). The output from "I" Channel Modulator 3 is applied over Lead 5 to an Adding Circuit 6. Adding Circuit 6 also receives the output from "Q" Channel Modulator 7 wherein the bits from the second bit stream, impressed on Input Terminal 8 and Amplifier 9 is modulated on a Quadrature Carrier which is ninety degrees (90°) out of phase with the carrier applied to Modulator 3. Modulator 7 produces a modulated Carrier Signal, the phase of which is shifted between zero and one hundred and eighty degrees (180°) by the individual bits. Both "Q" and "I" Channel Modulators 3 and 7 are Balanced Modulators so that the output is a double sideband, carrier suppressed signal. The "I" Channel Modulator also has a tone or pilot signal impressed thereon from a Bit Clock Oscillator shown generally at 10. These tone or pilot signals, at the clock frequency, are modulated onto the carrier to synchronize the local oscillator at the Receiver, and to provide clock pulses for the Serial Decoder and other equipment at the receiving terminal. The relationship of the tone or pilot signal to the frequency of the two sidebands will be explained in greater detail later. At this point, suffice it to say, that the repetition rate of the tone signals is such that it falls in that portion of the frequency spectrum where the modulating bits have no frequency components.

Local Oscillator 4 consists of a master oscillator 11, such as a crystal controlled oscillator or the like, which generates a 1728 kc. signal. The output of Oscillator 11 is applied to a Scale of Two Flip Flop Frequency Divider 12 which produces two square wave pulse trains of half the frequency, i.e. 864 kilocycles. The two 864 kilocycle pulse trains are each divided in Flip Flop Frequency Dividers 13 and 14 to produce carrier signal at a frequency of 432 kilocycles. Flip Flops 13 and 14 are inter connected by means of steering circuits, not shown, which establish the ninety degree (90°) phase relationship between the outputs of the two Flip Flops. Steering Circuits of this character are old and well known, and no further explanation thereof is required. Reference is hereby made to a Handbook of Selected Semiconductor Circuits NOBSR73231 prepared by Transistor Applications, Inc., for Bureau of Ships, Department of Navy, Navships 93484, dated September, 1959. Reference is also made to the textbook, Pulse and Digital Circuits—Millmann E. Taub, published by the McGraw Hill Book Company, etc., New York (1956), and particularly pages 430 through 431 and FIG. 14–2 described therein.

The two 432 kilocycle Carrier Signals are impressed on the respective Modulators 3 and 7 through suitable Amplifiers 15 and 16 to be modulated by the bit streams and combined in Adder 6. The output of Adder 6 is supplied through an Amplifier 17 and Filter 18 either directly to the transmitting antenna, cable, etc., or alternatively the now modulated signal may be further modulated onto another high frequency microwave carrier.

The Bit Clock Oscillator 10 produces clock pulses which are also modulated on the carrier to transmit a signal which may be used at the receiver to synchronize the local oscillator and which is used as a source of clock pulses in the Serial Decoder and other circuitry. The oscillator consists of a 220 kc. oscillator which is divided in Frequency Divider Flip Flop 19 to produce a 110 kilocycle clock pulse train which is applied through Amplifier 20 and Tone Level Setting Circuit 21 to the Channel Modulator 3. Tone Level Circuit 21 controls the amplitude of the 110 kilocycle Tone Signal which is modulated onto the carrier. The 110 kilocycle clock pulses are also applied over Output Terminal 22 to the Serial Encoder to control the rate at which the bits are clocked out of the Encoder Shift Register to form the two serial bit streams which are applied to the Modulators. Thus, it can be seen that the tone signal, which is modulated onto the carrier, has a pulse rate or repetition frequency equal to the rate at which serial bits are clocked out of the Serial Encoder. Hence, at the receiving end, these tone signals at 110 kilocycles may be utilized as clock pulses in the Serial Decoder and such to perform the various clock pulse functions.

Figure 2:
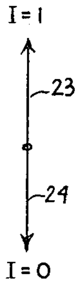
FIGS. 2 through 6 are Wave Form diagrams illustrating the manner in which the transmitter and modulator of FIG. 1 function.

The manner in which the Modulator of the FIG. 1 produces the modulated output signal, which is transmitted over the transmission medium, may be most easily understood by a reference to the vector diagrams illustrated in FIGS. 2–6. As adverted to briefly above, the data bit stream applied to the "I" Channel Modulator 3 modulates the carrier by reversing the phase of the carrier by one hundred eighty degrees (180°) for ONE and ZERO Bits. Thus, as shown in FIG. 2, the output of Modulator 3 is represented by vector 23 whenever the bit is a ONE and by the one hundred eighty degrees (180°) out of phase Vector 24 when the bit is a ZERO. The phase of these two vectors thus carries the information. Similarly, the output of "Q" Channel Modulator 7 is represented by Vector 25 of FIG. 3 whenever the bit in the second bit stream is a ONE and by the VECTOR 26 when the bit is a ZERO. The vectors representing the outputs of the two Modulators are in quadrature since the carrier applied to "Q" Channel Modulator 7 is ninety degrees (90°) out of phase with the carrier applied to "I" Channel Modulator 3.

Figure 4:
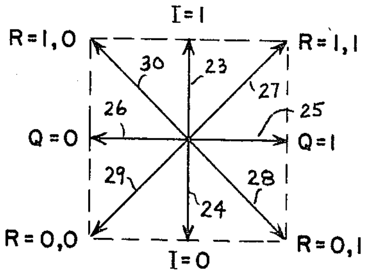

The two outputs are algebraically added in Adder Circuit 6 and the output of Adder Circuit 6 can take one of four phase positions, depending upon the four possible combinations of ONES and ZEROES, which are shown in FIG. 4. If the bits applied to the two Modulators are both ONES, the output of Adder 6 is represented by the Vector 27 which represents their vectorial sum of "I" and "Q" ONE Vectors 23 and 25. Similarly, Vectors 28–30 represent the remaining bit combinations, i.e., 01; 00; and 10. Thus, the Modulated Carrier Wave contains information about two individual bits, one from each data stream, and this information may then be extracted by the Demodulating Circuit by sensing and establishing the relationship of the vector with the original carrier signals.

Figure 5:
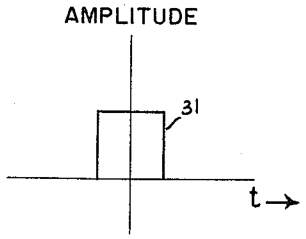
Figure 3:
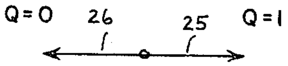
Figure 6:
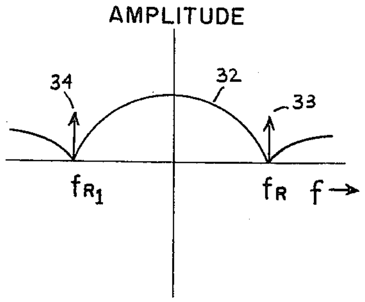

The function of the 110 kc. Tone Signal and its position in the frequency spectrum may be most easily understood by reference to FIGS. 5 and 6. Thus, as illustrated in FIG. 5, a random unit pulse 31 has an amplitude distribution with time as shown, the pulse representing in this instance a Binary ONE Bit. Such a pulse when subjected to a Fourier analysis has a frequency distribution of the type illustrated in the diagram of FIG. 6 wherein Amplitude A is plotted along the ordinate and Frequency F along the abscissa. Curve 32 indicates that there is a D.C. component in the pulse and varying frequency components out to infinity. Moreover, it will be noted that at frequency $f_r$ and $f_{r1}$ the pulse has no frequency component. The frequency $f_r$ and $f_{r1}$ is related to the pulse frequency in that it is equal to the repetition rate of the Pulse 31. Hence, by inserting a 110 kc. signal, which is the rate at which the Data Bits 31 are read out, Tone Signals 33 and 34 are inserted in the two sidebands in a frequency slot where the pulse has no frequency components. By then passing the signals through a filter having a bandpass equal to $|f_r - f_{r1}|$ only the modulated pulse signal and the tone signal are transmitted to the receiver.

The modulated signal from the demodulator is propagated over the transmission medium and is intercepted at the receiver terminal and the information, in the form of the Binary ONE and ZERO Bits is extracted from the carrier and transmitted to the Serial Decoder for further processing. Essentially, the modulated carrier, which is a double sideband, carrier suppressed signal, is processed in a phase coherent receiver wherein a carrier signal from a local oscillator of the same frequency as the transmitter carrier is reinserted into the double sideband signal ($fc \pm fm$) to demodulate the sidebands thereby to retrieve the individual bits. To this end, the received signal is fed to two balanced modulators along with carrier signals from the local oscillator. One modulator is supplied with a carrier $fc$ and the other modulator with a carrier $fc\angle 90°$. The carrier from the local oscillator and the received modulated sidebands interact to produce an output from the modulator which represents the individual bits modulated onto the carrier. However, since a carrier is reinserted in order to retrieve the information from the received signal, it is obvious that the carrier signal supplied by the local oscillator at the receiver must be of the same frequency and phase as the transmitter carrier lest errors be introduced in extracting the information. To this end, a phase locking circuit is provided which utilizes the 110 kc. tone signal transmitted along with the sidebands to generate an error signal proportional to any frequency and phase deviation of the carrier from the local oscillator from the transmit carrier. This error signal is utilized to control the local oscillator at the receiver to produce frequency and phase alignment. Unfortunately, however, even though the local oscillator carrier frequency is the same as the transmit carrier frequency, the local oscillator may lock in either of two stable phase conditions, i.e., zero degree with respect to the transmitter carrier or 180° out of phase. In the normal voice frequency receiver, this phase ambiguity of the local oscillator, i.e., either zero and 180°, is of no substantial significance since no perceptible effect on the transmitted voice signal is observed. However, in transmitting data in pulse form, *a*, 180° phase difference between the reinserted carrier from the local oscillator and the transmitter carrier produces intolerable errors, since it reverses the binary pulse infomation. That is, a transmitted ONE bit is retrieved as a ZERO bit, and a transmitted ZERO bit is retrieved as a ONE bit. Consequently further circuitry is provided for sensing and correcting any phase ambiguity so that the local oscillator is phase locked to the transmit carrier a zero degree phase difference exists at all times.

Figure 7:
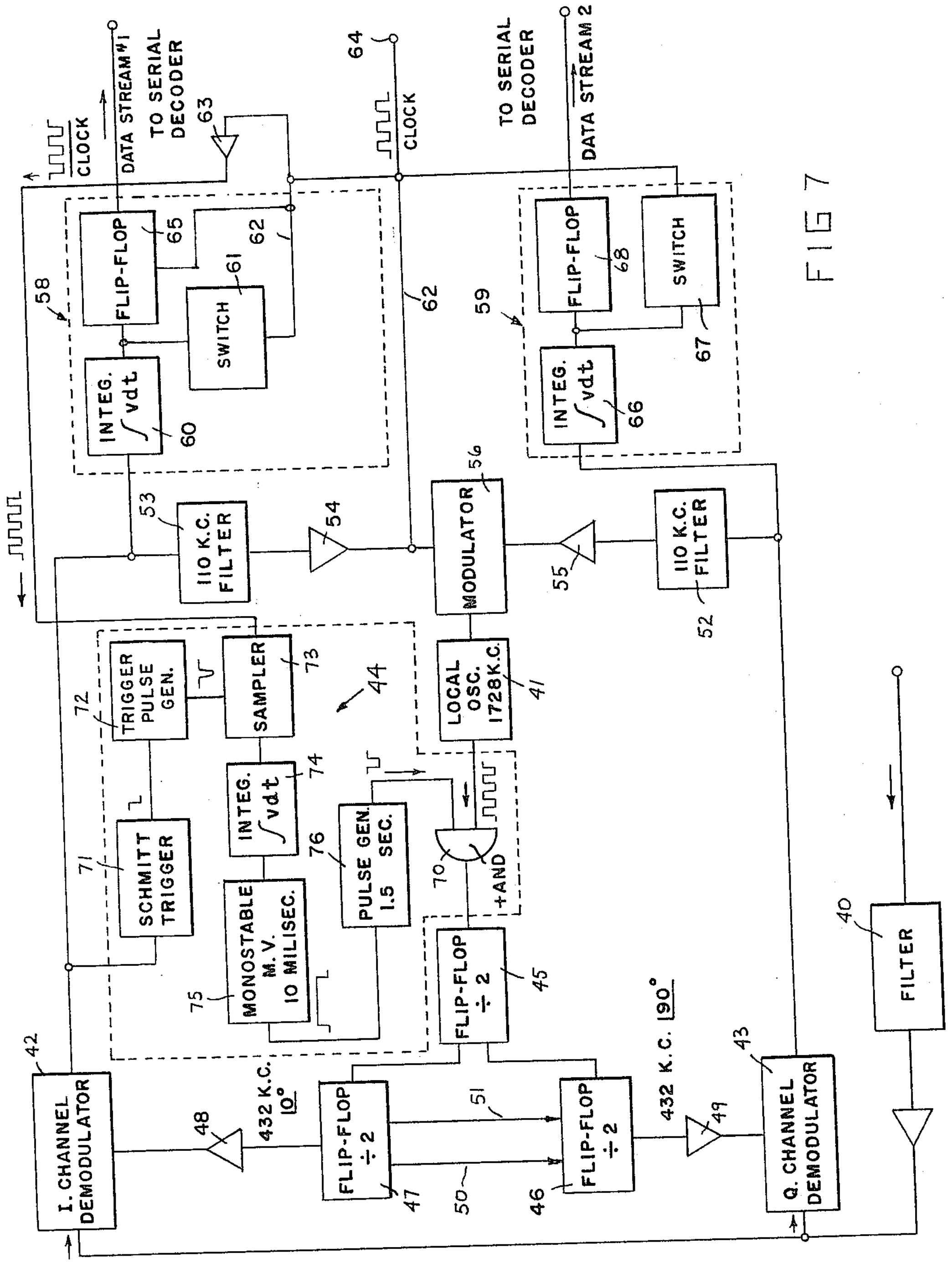
FIG. 7 is a schematic, in block diagram form, of the receiver which receives the modulated carrier and retrieves the serial bit stream from the carrier.

FIGURE 7 shows a block diagram of the Demodulator Circuitry in which the double sideband signal is filtered in Filter 40, amplified and applied to Balanced Demodulators 42 and 43 which are the "I" Channel and "Q" Channel Demodulators, respectively. A Local Oscillator 41 provides a carrier for the demodulators. The 1728 kc. carrier output from the Local Oscillator 41 is sensed and controlled in a Phase Ambiguity Director 44 to be described presently, and applied to a Frequency Dividing Flip Flop 45 which divides the oscillator pulse rate to 864 kilocycles. The 864 kilocycle pulses are applied to two further frequency dividing Flip Flops 46 and 47 to produce two 432 kc. pulse trains which are applied as the reinserted carriers to I and Q Demodulators 42 and 43. The output of Flip Flop 47 is applied to an Amplifier 48 and thence to the "I" Channel Demodulator 42 whereas the output of Flip Flop 46 is applied through Amplifier 49 to Q Channel Demodulator 43. The output from Flip Flop 46 is 90° out of phase with the output from Flip Flop 47 by virtue of the steering interconnection between these Flip Flops, referred to in relation to the Modulator of FIG. 8.

The Binary Bits are recovered at the output Demodulators 42 and 43, which are product demodulators. Whenever the reinserted carrier is in phase with one component of the modulated signal, an output pulse representing a ONE is produced. If the reinserted carrier is either in quadrature with or 180° out of phase with the modulated signal components, no output is produced from the modulator. Referring back to the diagram of FIG. 4, assume vector 23 now represents the reinserted carrier applied to Demodulator 42 and vector 25 represents the reinserted quadrature carrier to Demodulator 43, if the received signal is represented by the vector 27, indicating that a ONE bit stream was modulated onto the carrier, both the "I" Channel and the "Q" Channel Demodulators produce Binary One outputs since quadrature components of vector 27, along the "I" and "Q" axis, are in phase with the reinserted carriers. If, on the other hand, the phase of the received signal is represented by vector 28, one component lies along the "Q" axis and is in phase with vector 25 and "Q" Demodulator 43 will produce a ONE output. "I" Channel Demodulator 42, on the other hand, does not produce an output because the "I" component of vector 28 is 180° out of phase with the Reinserted Carrier 23 so that complete cancellation occurs. Similarly, with the other remaining possible positions of the modulated carrier it can be seen that the individual channel demodulators 42 and 43 will extract only the information for one of the serial bit streams thereby reconstituting the original modulating information impressed on the carrier. It will also be immediately clear that if the reinserted carriers 23–26 are 180° out of phase with the transmitter carrier, the binary information is inverted. For example, if the received signal is represented by vector 27 ($Q=I$ and $I=1$) and the reinserted carriers are 180° out of phase, the Phase of the reinserted carriers are represented by vectors 24 and 26. Thus, neither the I nor the Q Demodulator will produce an output since both components of the received signals are 180° out of phase with the reinserted carriers, and binary ZEROS rather than binary ONES are recovered. Thus, complete inversion of the code is produced with a transmitted ONE recovered as a ZERO and a transmitted ZERO recovered as a ONE.

The demodulated tone signal of Demodulators is used to sense any frequency and phase deviation between the local oscillator and the transmitted signal and to produce an error signal, which is used to control the Local Oscillator. To this end, the output from "Q" Channel Demodulator is passed through a narrow band 110 kilocycle tone filter 52. Similarly, the output of "I" Channel Denodulator 42 is passed through a 110 kc. tone filter 53. The two filters are coupled through Amplifiers 54 and 55 to a Product Demodulator 56. In the event that the local oscillator signal is in phase (or exactly 180 degrees out of phase) with the transmitter carrier, the tone signal will appear at the output of "I" Channel Demodulator 42 but not at the output of "Q" Channel Demodulator 43 (it will be remembered that at the modulator, the tone signal was modulated only onto the "I" channel carrier), since the tone signal is in phase with the inserted carrier to the "I" Demodulator and in quadrature with the Quadrature Carrier to "Q" Demodulator. As a result, the Product Demodulator 56 receives a tone signal from the "I" Channel but no tone signal from the "Q" Channel, and its output is, therefore, zero. Local Oscillator 41 maintains its frequency. If the reinserted carrier is not phase synchronized with the carrier at the transmitter, the reinserted carrier at "Q" Channel Demodulator 43 is no longer in quadrature with the tone signal and has a component which is in phase with the tone signal. As a result, a tone signal appears at the output of "Q" Demodulator, the amplitude of which is proportional to the amount of phase deviation. The tone output from "Q" Channel Demodulator 43 is now applied to Product Modulator 56 along with the tone signal from "I" Channel Demodulator 42, and Modulator 56 produces an error signal, the polarity and amplitude of which is proportional to the magnitude and direction of the phase deviation of the local oscillator. This error signal is applied directly to the local oscillator and varies its frequency until it again locks in with the transmitter carrier so that the reinserted carrier applied to "Q" Channel Demodulator 43 is once more in quadrature with the received signal.

The serial bit streams appearing at the output of Demodulators 42 and 43 are applied to Data Retrieval Circuits 58 and 59 in which the pulse shape of the recovered bit is reconstituted. That is, in the course of the propagation over the transmission medium noise and other factors may have produced series deterioration in the wave form of pulses. Circuits 58 and 59 include pulse shaping networks to produce the desired output pulse configurations for the bits. Referring now to Data Retrieval Circuit 58, the output signal from "I" Channel Demodulator 42 is applied to an Integrating Network 60 which may typically include a resistance-capacitance (R–C) Network. The integrator integrates the value of the output signal from the Demodulator and produces a voltage proportional to the average amplitude of the input signal. The capacitor forming part of the integrating Network 60 is periodically discharged by Switch Means 61 which is triggered at the clock pulse rate. The clock pulses for triggering Switch 61 are supplied over Lead 62 from the input of Modulator 56. The clock pulses are also applied to an output clock pulse Terminal 64 for transmission to the Serial Decoder and the remaining circuitry. The clock pulses are inverted in Amplifier 63 and applied to the Phase Ambiguity Detector 44. A Flip Flop 65 is connected to Integrator 60 and the switching and discharge of the Integrator triggers Flip Flop 65 to reconstitute the bit stream. Data Retrieval Circuit 59 is similar in construction and also includes and Integrating Network 66 connected to the output of "Q" Channel Demodulator 43. Integrator 66 is controlled by Switch 67 which is triggered at the clock pulse rate by the clock pulses from Lead 62. The output pulses from Integrator 66 trigger Flip Flop 68 thereby reconstituting the bit stream.

The Phase Ambiguity Detector, adverted to briefly above, senses whether the Local Oscillator Output is exactly in phase with the transmitter carrier or is one hundred eighty degree (180°) out of phase and controls a Local Oscillator plus (+) AND GATE 70 to regulate passage of the pulse train from Local Oscillator 41 to Flip Flop 45. If the Local Oscillator signal is exactly in phase with the transmitted carrier, AND GATE 70 is enabled and the pulses from the Local Oscillator are passed to Flip Flop 45. In the event the Local Oscillator signal is one hundred eighty degrees (180°) out of phase with the transmitter carrier, a control signal of fixed duration is generated which disables AND GATE 70 for a sufficient time to produce a one hundred eighty degree (180°) phase reversal before the local oscillator signals are again permitted to pass through the Gate to the Flip Flop.

Briefly, Phase Ambiguity Detector 44 senses the polarity of the clock pulse each time the output bits from "I" Channel Demodulator 42 have a ZERO crossing. Since the character bits are clocked out of the Serial Encoder during the positive clock pulse half (the positive leading edge of the clock pulse resets the Shift Register Flip Flop to shift out the bits), this provides a means to determine whether the local oscillator is in phase or 180° out of phase with the transmitter carrier. If the local oscillator is in phase to permit proper demodulation, the ZERO crossings of the bits will still occur during the positive clock pulse halves. If, on the other hand, it is 180° out of phase, the clock pulses and the ONE and ZERO bits will be inverted, and the ZERO crossings will occur during the negative clock pulse halves. This change in polarity may be used to generate a control voltage which triggers a number of pulse generators to produce the inhibiting signal for AND GATE 70.

The Phase Ambiguity Detector includes a Schmitt Trigger 71 connected directly to the output of "I" Channel Demodulator 42. The Schmitt Trigger is a well known device and produces a negative going pulse transition each time the output from the "I" Channel Demodulator crosses zero, indicating a change from Binary ONE to ZERO or from Binary ZERO to ONE.

The negative going pulses actuate a trigger Pulse Generator 72 which produces a short negative triggering pulse in response to each pulse from the Schmitt Trigger. These negative pulses are applied to a Sampler 73 which also receives a pulse train representative of the demodulated clock pulses. The pulse train is at the clock frequency but is the inverted clock pulse train, so that the positive clock pulse half is represented by a negative pulse and the negative clock pulse half by a positive pulse. This pulse train is defined by the logical designation of "not clock." The output of Sampler 73 is connected to an Integrating Circuit 74 which includes a storage device such as a capacitor. The Capacitor is charged to a given voltgae level as long as the negative going pulses from Trigger Pulse Generator occur in a proper phase relationship to the "not clock" pulses which means that the zero crossings of the bits have the proper phase relationship to the clock pulses. That is, if the negative pulse from the Trigger Pulse Generator (the ZERO crossing) occurs during the negative half of the not clock pulse (i.e., the positive half of the clock pulse), Integrating Circuit 74 charges to voltage level which inhibits a One Shot 75 and no inhibiting pulse is generated by Pulse Generator 76 for AND GATE 70. If the Phase of the negative pulse from the Trigger Pulse Generator and the Clock Pulse applied to Sampler 73 is incorrect (which means the ZERO crossings are occurring during the negative clock pulse half), the voltage from Integrator 74 triggers the One Shot 75. One Shot 75 produces a ten millisecond positive pulse, the leading edge of which triggers Pulse Generator 76 to generate a 1.5 microsecond negative inhibiting pulse. The negative inhibiting pulse is applied to and inhibits AND GATE 70 preventing passage of pulses from Local Oscillator 41 to Flip Flop 45. The timing and duration of the inhibiting pulse is such that the Frequency Dividing Flip Flops 45, 46 and 47 are again retriggered with a phase change of 180°, thus locking Local Oscillator 41 in exact phase synchronism with the Transmission Carrier.

THE PHASE AMBIGUITY DETECTOR

The Phase Ambiguity Detector senses the bit zero crossings, as the bits change in both directions between ONE and ZERO, and determines whether these occur during the positive clock pulse half to determine whether the phase relationship between the recovered signal and the original carrier is correct. That is, it will be recalled that the bit stream made up of the control and data characters are read out of the Serial Encoder illustrated in the co-pending Robbins application or some similar data bit source during the positive half of the clock pulse. Consequently, if phase coherence is maintained after transmission, the data character crossing in the recovered data should also occur during the positive half of the clock pulse which have been transmitted along with the data as a tone signal. If, on the other hand, the data crossings in the recovered signal occur during the negative clock pulse half, this is an indication that there has been 180° phase inversion. The phase of the local oscillator must, therefore, be inverted by 180° in order to re-establish the proper phase relationship. By generating a pulse in response to each ZERO crossing of the recovered bits and by comparing the same with the recovered clock pulses, a signal may be generated, the polarity of which indicates whether the ZERO crossings are taking place during the positive or the negative clock pulse halves. This control signal is utilized to trigger a Pulse Generator which inhibits the Local Oscillator Pulse Gate. No pulses are transmitted to the Dividing Flip Flops for a sufficient number of counts to produce a 180° phase reversal of the reinserted carrier applied to the "Q" and "I" Channel Demodulators.

Figure 8:
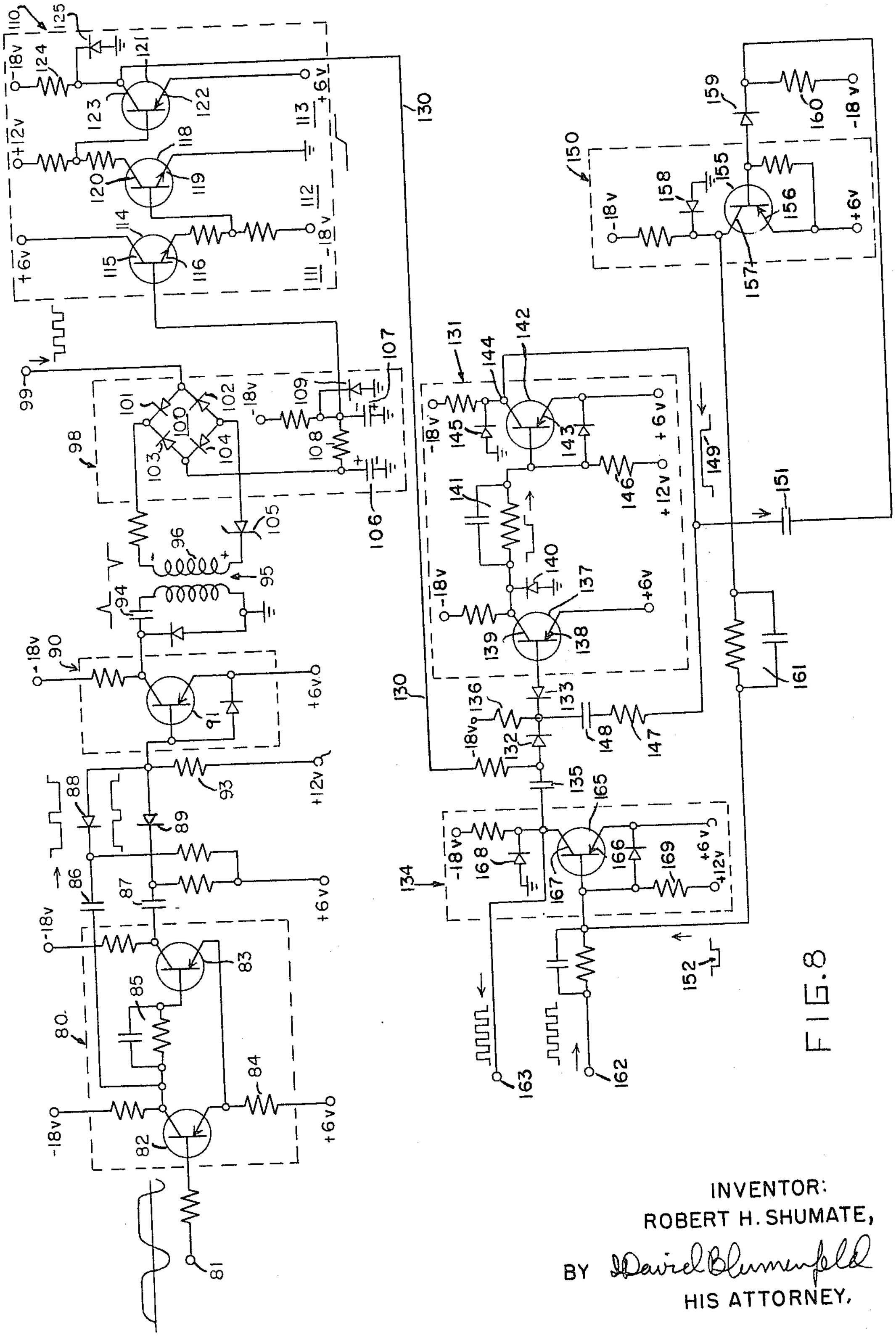
FIG. 8 is a circuit diagram of the Phase Ambiguity circuit forming a part of the receiver of FIG. 7.

The Phase Ambiguity Detector Circuitry is illustrated in FIG. 8 and includes a Schmitt Trigger 80, which receives the recovered bit stream from the "I" Channel Demodulator over Input Terminal 81. The Schmitt Trigger includes PNP Transistors 82 and 83 having their emitters connected through a Common Emitter Resistor 84 to a source of positive potential. The base of PNP Transistor 82 is connected to Input Terminal 81. The collector of Transistor 82 is connected to the base of PNP Transistor 83 through an RC Coupling Network 85. Whenever the input signal crosses zero and becomes sufficiently positive to exceed the triggering voltage of the device, the base of Transistor 82 becomes sufficiently positive to drive it to cut off. This produces a voltage drop at the Collector which is transmitted to the base of Transistor 83 causing it to become conducting. Since the emitter of Transistor 83 is also connected to the Common Emitter Resistance 84, the current flowing through the Resistor 84 is increased, raising the emitter voltage of Transistor 82 toward ground thereby accelerating the rate at which Transistor 82 turns off. As long as the input voltage exceeds the positive triggering voltage of the trigger, Transistor 82 remains in the cut off state, and Transistor 83 conducts.

If the input signal crosses zero so that the voltage at Terminal 81 drops and goes negative, Transistor 82 begins to conduct, as soon as the voltage exceeds the triggering voltage, and the voltage at its collector rises reducing the conductivity of Transistor 83. This reduces the current through Common Emitter Resistor 84, and the Emitter Voltage of Transistor 82 rises causing the transistor to conduct more heavily. This raises the potential at its collector, and PNP Transistor 83 is rapidly driven into the nonconducting state. The two transistors forming the Schmitt Trigger are alternately switched between the conducting and the nonconducting states whenever the recovered signal crosses zero and exceeds the triggering voltage of the device.

The output voltages at the collectors of Transistors 82 and 83 go negative when the transistor is cut off and rise when the transistor is driven into the conducting state. Separate outputs are taken from the collectors of each of the transistors to produce two signals of opposite polarity.

These two signals are applied through Coupling Capacitors 86 and 87 to a pair of Diodes 88 and 89. Diodes 88 and 89 are so poled that they pass only negative pulses. As a result, diode 88 passes a negative pulse whenever Transistor 82 is cut off, indicating that the signal at Input Terminal 81 has crossed zero in the positive direction, and Diode 89 passes a negative pulse whenever Transistor 83 is cut off, indicating that the signal at Input Terminal 81 has crossed zero in the negative direction. Since these transistors go into the nonconductive state respectively on the leading and lagging edges of the signal recovered from the "I" Channel Demodulator it can be seen that a negative pulse is produced for each data crossing of the input signal.

The negative pulses are applied to a Triggering Pulse Generator shown generally at 90 which generates a positive going output pulse of short duration for each of the negative input pulses. Pulse Generator 90 consists of a PNP Transistor 91 which is normally biased to cut off by having its base returned to a positive biasing voltage at Terminal 92 through a Resistance 93. The positive biasing voltage at the base of the transistor is more positive than the positive voltage applied to its emitter; and, hence, the base-emitter junction is reverse biased, and the transistor does not conduct. The appearance of a negative going pulse to the base of Transistor 91 momentarily overcomes the positive bias applied to the base and produces momentary conduction through the transistor thereby producing at its collector a short positive going pulse, which is coupled through a Blocking Capacitor 94 to the primary winding of a Transformer 95. Secondary Winding 96 of the Transformer is connected to a Sampling Circuit 98 where the phase of the zero crossing of the inverted clock pulses at Clock Input Pulses Terminal 99 are compared to generate a control signal which is representative of the phase relationship of the data crossings and the polarity of the clock pulses.

The positive pulse applied to the primary winding of Transformer 55 is inverted by virtue of transformer action to produce a negative pulse on the Secondary Winding 96 with the polarity indicated by the plus (+) or minus (−) mark sign. This negative pulse is applied across one diagonal of a Diode Bridge 100 which consists of four Diodes 101–104. A Zener Diode 105 is connected between the lower end of the Transformer Secondary 46 and one terminal of the Bridge 100. The Zener Diode prevents Diode Bridge 100 from conducting in the absence of a negative pulse across secondary Winding 46. Connected across the other diagonal of Diode Bridge 100 is the Clock Pulse Input Terminal 99 and a Storage Network which charges to a polarity and voltage level which is a function of the phase relationship of the signal zero crossings and the clock pulses. The Storage Network consists of a first Capacitor 106 connected directly to Bridge 100 and an integrating Network comprising Resistance 108 and Capacitance 107 so that integrating capacitor 107 charges to the average value of the voltage across Storage Capacitor 106.

The junction of Resistance 108 and Capacitor 107 is connected through a Resistance to a source of negative voltage (−18 volts). The junction is also connected through a Diode 109 to ground potential. Diode 109 acts as a clamping diode and clamps the junction of Resistance 108 and Capacitor 107 to ground. Thus, Capacitor 107 can charge up to a positive voltage with respect to ground but cannot charge to a negative level with respect to ground since Diode 109 conducts and clamps the junction to the ground potential. If the negative pulses across secondary Winding 96 occur during the time that the inverted clock pulse at Terminal 99 are positive, a conducting path through Diode Bridge 100 is established so that Capacitors 106 and 107 charge to a positive voltage. A positive voltage is an indication that the inserted carrier is 180° out of phase with the original transmitter carrier and that a phase change of the carrier must be established.

[T]hat is, when the inverted Clock at Terminal 99 is positive, [t]he actual clock is negative which means that the zero [c]rossings are occurring during the negative clock pulse [h]alf, and there has been an inversion of clock pulses and [t]he serial bit stream. If, on the other hand, the pulses [f]rom the Schmitt Trigger occur when the inverted clock [p]ulses at Terminal 99 are negative, discharging the storage [c]apacitors toward ground or zero volts, this is an indica[t]ion that the zero crossings are taking place during the [p]ositive clock pulse halves and the reinserted carrier is in [p]hase with the transmitter carrier.

The voltage across Storage Capacitors 106 and 107 is [a]pplied to an Amplifying Circuit 110. Amplifying Cir[c]uit 110 consists of an Emitter Follower 111 and Common Emitter Amplifiers 112 and 113. The voltage from the Storage Circuit is applied to the base of an NPN Transistor 114, connected in an emitter-follower configuration. Transistor 114 includes a Collector 115 connected directly to a source of positive voltage and an Emitter 116 connected through a pair of dropping resistances to the negative terminal of a source of energizing voltage. The output from Emitter Follower 111 is applied to the base of another NPN Transistor 118 connected in a common-emitter configuration. Transistor 118 includes an Emitter 119 connected directly to ground and a Collector 120 connected through a pair of series connected resistances to the positive terminal of a source of energizing voltages. The ontput of Common Emitter 112 is taken from the collector and applied to the base of a PNP Transistor 121 connected in the Common-Emitter configuration. Transistor 121 includes an emitter 122 connected directly to the positive terminal of a source of energizing voltage and a Collector 123 connected to a dropping Resistance 124 to the negative terminal of the source of energy. Collector 123 of PNP Transistor 121 is clamped to ground by means of the Diode 125, the cathode of which is connected directly to the collector and the anode of which is grounded.

With Transistor 121 in the nonconducting state the cathode of the clamping diode is essentially at the voltage of the negative collector voltage; and hence, the diode conducts heavily. When the diode conducts, its impedance is very low, and the collector is maintained essentially at ground potential. If the transistor becomes conducting, the Collector-Emitter Resistance of the transistor drops to a very low value, and the collector rises essentially to the potential at the positive terminal to which the emitter is connected. Thus, in changing between the non-conducting and conducting states the collector output voltage of PNP Trasistor 121 varies between zero and a fixed positive voltage (+6 v.). The collector is connected by Lead 130 to the input of a One Shot 131. Whenever the voltage at the collector of Transistor 123 goes positive, One Shot 131 is triggered to produce an output pulse which is utilized initiating a sequence of actions which disables the AND GATE through which the local oscillator signal is transmitted to the Demodulators.

If the voltage across Storage Capacitors 106 and 107 goes positive, indicating that the zero crossings occurring during the negative halves of the clock pulses, and hence at 180° phase error, Emitter Follower 111 conducts heavily, and the voltage at its emitter goes more positive. Since the base of NPN Transistor 120 of the common emitter stage 112 is connected to the emitter, the positive voltage causes this transistor to become conductive. The voltage at its collector drops applying a negative going voltage to the base of Common Emitter 113. The PNP Transistor of Common Emitter stage 113 is driven into conduction by the negative going voltage applied to its base and the collector voltage rises from ground to a positive value. This applies a positive voltage to Diodes 132 and 133 which are connected to the input of One Shot 131. The One Shot is then triggered by a pulse from AND GATE 134 through Coupling Capacitor 135 and generates a positive ten millisecond output pulse.

If on the other hand, the pulses from the Schmitt Trigger coincide with the negative halves of the inverted clock pulses at Terminal 99. Capacitors 106 and 107 discharge towards ground potential, and the signal applied to the base electrode of Emitter Follower 111 drops. The output voltage from the emitter drops correspondingly and applies a negative going voltage to the base of Common-Emitter Amplifier 112. Transistor 118 of Amplifier 112 is less conductive, and the voltage at its collector rises. This positive going voltage at the collector of Transistor 118 is applied to the base of PNP Transistor 121 reverse biasing its Emitter-Base Junction and causing it to become nonconducting so that the voltage at its collector goes to ground. Whenever the output of Common Emitter Amplifier 113 is at ground or zero voltage the junction of coupling capacitor 135 and Diode 132 is at ground potential and positive pulses from AND GATE 134 cannot pass through Diodes 132 and 133 to trigger One Shot 131.

If the voltage at the collector of Common Emitter Amplifier 121 rises to a positive level, however, the next positive going output pulse from AND GATE 134 momentarily increases conduction of Diode 132. This increases the voltage drop acrosss Resistor 136 connected between a negative biasing source and the junction of Diodes 132 and 133, and the voltage at the junction momentarily goes more positive. This short positive pulse is applied to One Shot 131 and triggers it.

One Shot 131 consists of a PNP Transistor 137 having an emitter 138 connected to a source of positive potential, and a Collector 139 connected through a dropping resistance to a negative terminal of a source of energizing voltage. The Collector 139 is clamped to ground through a Clamping Diode 140 so that the output voltage at the collector is at ground when the transistor is not conducting and is substantially at the positive emitter voltage when the transistor is conducting. The collector of Transistor 137 is connected through an RC Network 141 to the base of a second PNP Transistor 142, which includes an Emitter 143 connected to the positive terminal of a source of energizing voltage and a Collector 144 connected to the negative terminal of the energizing source. Collector 144 of the transistor is again clamped to ground by Clamping Diode 145 so that the voltage at the collector is at ground when the transistor is in a nonconducting state and essentially at the voltage of the positive emitter voltage source when the transistor conducts. The base of Transistor 142 is connected through a dropping Resistance 146 to a source of positive potential which is more positive than the emitter potential. Transistor 142 is thus normally biased to cut off since the base-emitter junction is reverse biased. Transistor 137, on the other hand, is normally conducting since its base is connected through the Input Diode 133, and a Resistance 136 to a negative biasing source. The short positive pulse, which is transmitted when the junction of Coupling Capacitor 135 and Diode 132 goes positive, is applied to the base of Transistor 137 reducing its conductivity so that its collector voltage drops. A negative going voltage is applied from Collector 139 to the base of Transistor 142. Transistor 142, therefore, begins conducting, and the voltage at its collector begins to rise. This rising voltage at the collector of Transistor 142 is fed back to the base of Transistor 137 through a feedback network comprising the Resistance 147 and the Capacitor 148. This further reduces the conductivity of Transistor 137 and the voltage at its collector goes even more positive which causes Transistor 142 to conduct more heavily and its collector voltage rises further. This process continues very rapidly until Transistor 137 is driven to cut off and Transistor 142 becomes fully conductive.

The two transistors remain in this state until the charge on the capacitor of Resistance Capacitance Network 141 has discharged through the shunting resistor, removing the negative voltage from the base of Transistor 142 so that the positive biasing voltage terminates conduction of this transistor. That is, the appearance of the initial triggering pulse which caused Transistor 137 to become nonconducting and its collector voltage to drop to ground potential, produces a current flow through the resistance of RC Network 141. The capacitor of the RC Network, which is connected in shunt with the resistance, therefore, charges up to this voltage with the same polarity. As may be seen by observation, the polarity of the voltage across the capacitor is such as to apply a negative voltage to the base of Transistor 142 which overcomes the effect of the positive biasing voltage and maintains the transistor in a conducting state. However, as the charge on the capacitor begins to leak through its associated resistor, the voltage across the capacitor drops until eventually the negative voltage on the capacitor is insufficient to overcome the effect of the positive biasing voltage, and Transistor 142 is again returned to the nonconducting state. The voltage at its collector, therefore, begins to drop, and this negative going voltage is applied to the base of Transistor 137 until that transistor becomes conducting. The time interval before the One Shot returns to its original state is, of course, determined by the RC time constant of Network 141. In this particular instance, the RC time constant is so chosen that a period of ten milliseconds elapses before the One Shot returns to its original state.

A Positive Pulse 149, which has a ten (10) millisecond duration, is produced at the output of the One Shot 131. This positive pulse is applied through a Coupling Capacitor 151 to the input of a Pulse Generator 150, which is triggered by the leading edge of Pulse 149, and produces a short negative Pulse 152 which has a duration of approximately 1.5 microseconds, and which is applied to the input of AND GATE 134.

Pulse Generator 150 consists of a PNP Transistor 155 having an Emitter 156 connected directly to the positive terminal of a source of energizing voltage and a Collector 157 which is connected through a suitable resistance to the negative terminal of the source of energizing voltage. Collector 157 is clamped to ground by means of a Clamping Diode 158 which, as previously explained, maintains the collector voltage of the transistor at ground potential if the transistor is not conducting and at the positive emitter voltage when the transistor is conducting. Transistor 155 is biased into the conducting state in the absence of a positive pulse from One Shot 131. To this end, the base of the transistor is connected through a Diode 159 and Resistance 160 to a source of negative potential which is sufficiently large to keep the base-emitter diode of the transistor forward biased and the transistor conducting heavily. Under normal circumstances the voltage at Collector 157 is, therefore, positive. Positive Leading Edge of Pulse 149 reduces conduction of Diode 159, and a positive pulse is applied to the base of Transistor 155. This positive pulse drives the transistor into the nonconducting state, and the voltage at its collector goes from the positive voltage to ground for an interval of approximately 1.5 microseconds. This negative going pulse 152 is applied through an RC Network 161 to the input of AND GATE 134.

The Negative Going Pulse 152 disables AND GATE 134 so that pulses appearing at the AND GATE Input Terminal 162 are not transmitted through the Gate and do not appear at the Output Terminal 163. AND GATE 134 includes a PNP Transistor 165 having an Emitter 166 and a Collector 167. The emitter is connected directly to the positive terminal of a source of energizing voltage, and the collector is connected through a suitable resistance to the negative terminal of the energizing voltage and is clamped to ground by the Clamping Diode 168. The base of Transistor 165 is connected through a Resistance 169 to a source of positive biasing potential which reverse biases the emitter-base junction and maintains the transistor in a nonconductive state in the absence of an input pulse to overcome the effects of this bias.

In the absence of positive output Pulse 149 from One Shot 131 the output of Pulse Generator 150 is positive since Transistor 155 is conducting. This positive voltage is applied to the base of Transistor 165 forming part of AND GATE 134. Transistor 165 is nonconducting and its collector voltage is clamped to ground by Clamping Diode 168. When a positive local oscillator pulse appears at Input 162, it has no effect on Transistor 165 since this transistor is already cut off by the positive voltages being applied from the bias source and from Pulse Generator 150. However, when the local oscillator pulse goes to zero or ground, the base of Transistor 165 suddenly becomes more negative than its emitter and Transistor 165 conducts for the duration of this half of the local oscillator pulse. When Transistor 165 conducts the voltage at its collector rises approximately to the value of the positive voltage at the emitter. A pulse train, therefore, appears at Output Terminal 163 which is 180° out of phase with the input pulse train at Terminal 162. That is, whenever the input pulse is positive the output is at zero, and conversely when the input pulse goes to zero the output goes positive. In any event, as long as there is a positive output from Pulse Generator 150, and the local oscillator is supplying signals to Input Terminal 162, a pulse train is present at the output of AND GATE 134 which is of the same frequency as the local oscillator signal.

If, however, the output from Sampling Circuit 98 has gone positive, indicating that the local oscillator has locked in 180° out of phase with the transmitter carrier, the output of Common Emitter Amplifier 113 goes positive and the next positive pulse produced at Collector 167 of AND GATE Transistor 165 triggers One Shot 131. The leading edge of the positive pulse from One Shot 131 triggers Pulse Generator 150 and produces a 1.5 microsecond negative pulse 152 which is applied to the base of AND GATE Transistor 165 disabling the GATE. That is, as soon as Transistor 155 of Pulse Generator 150 stops conducting the voltage at its collector drops from the positive value to ground by virtue of the action of the Clamping Diode 158. This clamps the base of Transistor 165 to ground potential for the duration of the pulse. Transistor 165 conducts heavily, and the voltage at its collector remains at a positive value. As long as the base of Transistor 165 is clamped to ground, a positive pulse at Terminal 162 cannot raise the potential of the base to drive the transistor into the nonconducting state. When the incoming pulse goes zero, this has no effect since the transistor is already conducting. Consequently the voltage at the collector Transistor 165 rises to a positive value and remains at a positive value until the termination of the Negative Pulse 152. During this interval, no pulses from the local oscillator are present at Output Terminal 163. As was pointed out previously, Pulse 152 has a duration of approximately 1.5 microseconds. It will be recalled that the repetition frequency of the local oscillator was approximately 1,728 kilocycles so that the period $t$ of the pulses from the local oscillators is approximately .58 microsecond. Hence, negative Pulse 152 from the Pulse Generator 150 disables AND GATE 134 for a sufficient length of time to prevent two local oscillator leading pulse edges from passing through the gate. This, as will be seen presently, produces the desired 180° phase reversal.

Figures 9, 10, 11, 12, 13, 14, 15, 16, 17, 18:
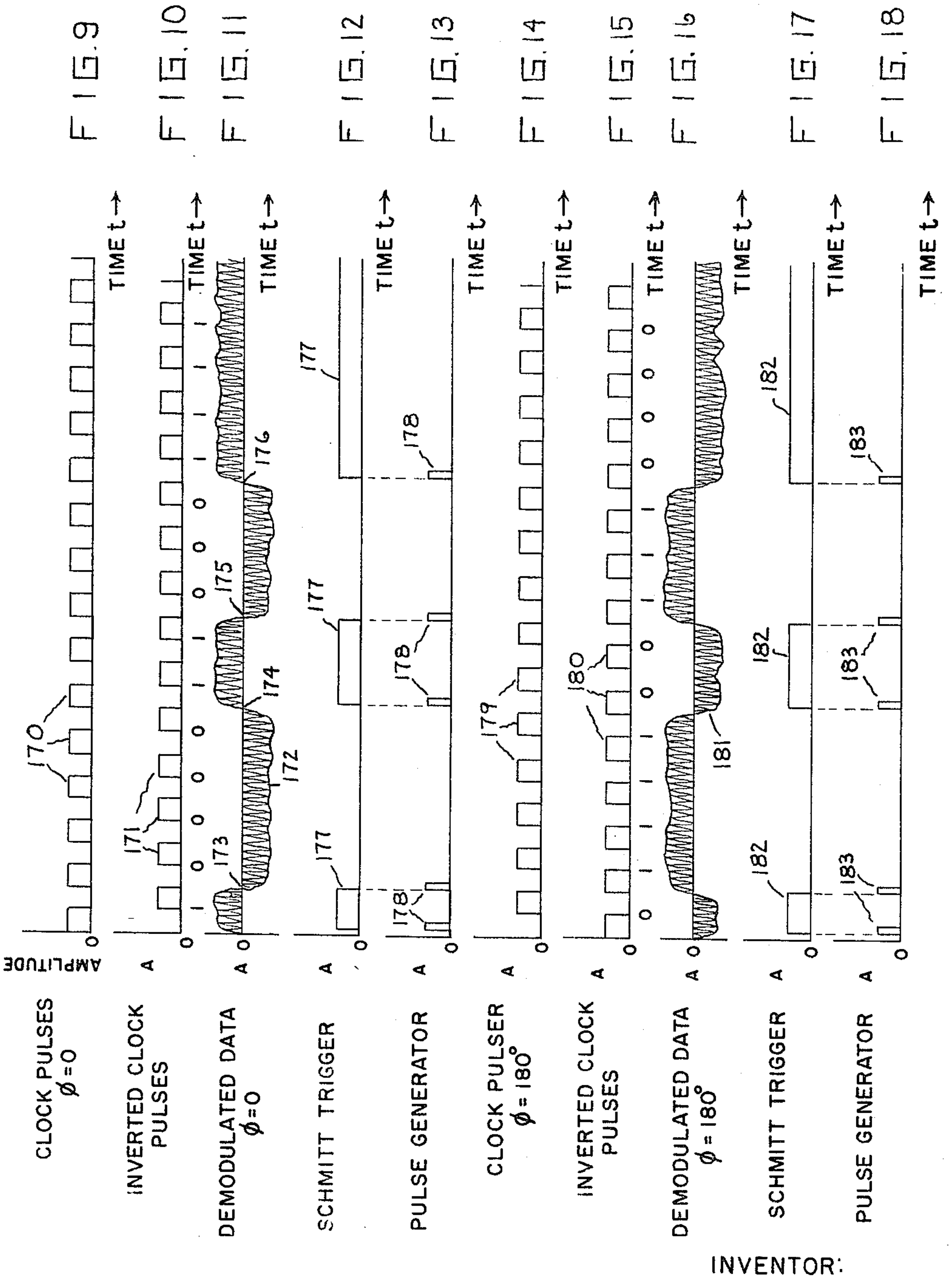
FIGS. 9 through 25 are Wave Form diagrams showing the operation of the phase ambiguity circuit of FIG. 8.

The exact operation of Phase Ambiguity network illustrated in FIG. 8 may be most easily understood by reference to the wave form diagram illustrated respectively in FIGS. 9 through 25. FIG. 9 shows clock pulse wave form at the output of the "I" Channel Demodulator for the condition where the local oscillator signal is exactly in phase with the transmitted carrier, i.e., phase difference $\phi=0°$. These clock pulses 170 shift during each clock pulse half between ground and some positive value. FIG. 10 shows the inverted clock pulses 171 which are obtained from the Data Recovery Circuit and applied to Sampling Circuit 98 of the Phase Ambiguity Circuit. These pulses are 180° out of phase with clock pulses 170 and are positive when the clock pulse is negative, and vice versa. FIG. 11 shows the recovered Signal 172 appearing at the output of the Demodulator for the condition that $\phi=0$. The wave form, as may be noted by observation, is deteriorated in shape by virtue of the transmission and has a positive value for Binary ONES and a negative value for Binary ZEROES. Thus, Wave Form 172 illustrated in FIG. 18, for example, represents a series of binary characters coded as a 10000110001111. It will also noted that the transitions between a Binary ONE and a Binary ZERO and conversely between ZERO and ONE, as shown by the zero crossings 173–176, occur during the positive halves of Clock Pulses 170, indicating that the proper phase relationship has been maintained. It will also be seen that for $\phi=0$, the transitions occur during the negative half of the inverted Clock Pulse 171.

The recovered signal 172 when applied to the Schmitt Trigger 80 produces Output Pulses 177 a finite time ($t_1$) after the signal has crossed the zero axis in either direction. Triggering Pulse Generator 90 produces a Pulse 178 each time the data character crosses the zero axis. These pulses are inverted and applied to the Diode Bridge 100 of Sampling Circuit 98. It can be seen that in this particular case each of the Pulses 178, or rather their negative, occurs during the interval when the inverted Clock Pulses 171 are at zero volts. As a result, Storage Capacitors 106 and 107 do not charge up to a positive value but are maintained at ground potential by Clamping Diode 109.

If, on the other hand, the local oscillator is 180° out of phase with the carrier at the transmitter, i.e. the phase difference $\phi=180°$ the Clock Pulses 170 are inverted. The Clock Pulses 179 for $\phi=180°$ are illustrated in FIG. 14 and by comparison with FIG. 9 may be seen to be exactly 180° out of phase. Similarly, the inverted Clock Pulses 180 are 180° out of phase with the inverted Clock Pulses 171 of FIG. 10. The recovered signal 181 is also inverted with respect to Signal 172 of FIG. 11. It will be seen that by inverting the recovered signal the code is also inverted. Whereas in the proper position the wave form represented a 10000110001111 code, the inverted wave form inverts the ONES and ZEROES and produces a 01111001110000 code. This, of course, is an intolerable situation which is in a system for transmitting Binary Data since the computer or other utilization equipment will receive completely erroneous information as a result of the inversion produced by the 180 phase difference between the local oscillator and the transmitter carrier.

The Schmitt Trigger upon receiving signal 181 produces output pulse 182 which are applied to the Trigger Pulse Generator to produce a pulse 183 for the leading and lagging edges of Pulses 182. These pulses occur during the negative or zero half of Clock Pulses 179 and during the positive half of inverted Clock Pulses 180. Capacitors 106 and 107 now charge to a positive voltage. The voltage at the collector of Common Emitter 113 goes positive and readies One Shot 131 so that it is triggered by the next positive output pulse from AND GATE 134.

Figures 19, 20, 21, 22, 23, 24, 25:
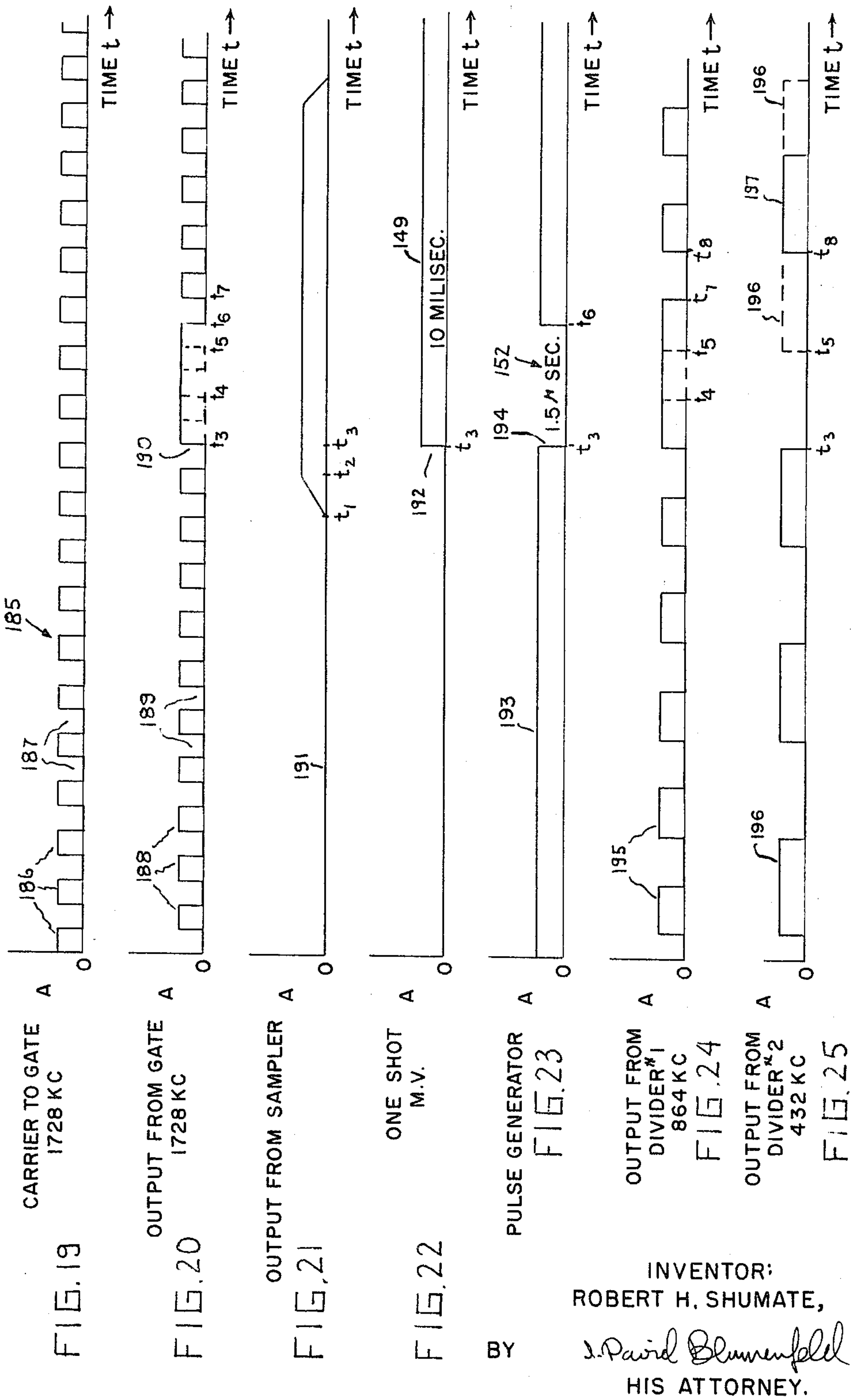

The manner in which Disabling Local Oscillator AND GATE 134 produces the desired 180° phase reversals may best be understood by considering wave forms illustrated in FIGS. 19 through 25. FIG. 19 illustrates the wave form of the local oscillator signal applied to GATE 134. The repetition rate of Local Oscillator Signal 185 is 1728 k.c. so that the period of one pulse is approximately .58 microsecond. Under normal conditions, Transistor 165, forming part of AND GATE 134, is biased to cut off by the positive voltage applied to its base from Pulse Generator 150. The positive halves 186 of the signal have no effect on Transistor 165 which is already cut off so that the voltage at Collector 167 is clamped to ground by Clamping Diode 168. When the local oscillator signal goes to zero at 187, the base of Transistor 165 is driven to ground, the transistor conducts and the voltage at its collector rises to a positive value. FIG. 20 illustrates the voltage variations at the collector of Transistor 165 and hence at the Output Terminal 163. Thus, whenever the Input Signal 185 is at its positive value 186, and the transistor is cut off, the collector voltage is at zero, as shown at 189. When the input signal goes to zero at 187, Transistor 165 conducts and the voltage at the collector goes positive producing a positive going Pulse 188. Thus during normal operation, the output at the Collector of Transistor 165 and at Output Terminal 163 is 180° out of phase with the input. As long as the Output over Line 130 from Common Emitter Output Amplifier 113 is at zero, as illustrated at 191 in FIG. 21, the AND GATE is operative, and the local oscillator signals are transmitted through the GATE in an inverted form, to be further divided to provide the desired 432 kilocycle carrier for the Demodulators. However, assuming that the phase relationship of the local carrier to the transmitter carrier is wrong, at sometime $t_1$ the voltage at the output of the Sampling Circuit starts going positive and the collector voltage of Common Emitter 113 rises towards and reaches the positive value at $t_2$. The next positive Pulse 190 from Transistor 165, at $t_3$, triggers One Shot 131 which produces positive Pulse 149, shown in FIG. 22.

The Leading Edge 192 of Pulse 149 is applied to the base of PNP Transistor 155 of Pulse Generator 150 and drives the transistor into the nonconducting state so that at $t_3$ the output voltage 193, as shown in FIG. 23, goes to ground. This negative going voltage 194 representing pulse drives Transistor 165 of the AND GATE to conduction and maintains conduction for the duration of the pulse ($t_3-t_6$). There are, therefore, no output pulses from the collector of the transistor 165. This may be seen in FIG. 20, i.e., at $t_3$ the GATE is disabled since negative pulse 152 drives PNP transistor 165 into conduction for its entire duration by clamping the base of the transistor to ground through network 161 and clamping diode 153 associated with the transistor of pulse generator 150. The voltage at Collector 167 rises to a positive value and remains there until the Output from the Pulse Generator goes positive again at $t_6$. During the interval $t_3-t_6$, no pulses are passed.

The manner in which this effects a 180° phase inversion of the signal applied to modulators may be seen in connection with FIG. 24 and 25. It will be recalled that the output from AND GATE 134 at 1728 kilocycles is divided in Flip Flop 45 of FIG. 7 to produce a 864 kilocycle output. The 864 kilocycle output is shown at 195 in FIG. 24. It will be noted that one 864 kilocycle pulse is generated for every two pulses of the local oscillator signal and that the transitions always occur on the positive going edge of the local Oscillator Signal 188. The 864 kilocycle pulses are further divided to produce 432 kilocycle pulses which are applied to the Demodulators. The 432 kilocycle pulses are illustrated at 196 and occur at half the rate of the 864 kilocycle Pulses 195, with the transitions taking place in response to a positive going edge of the 864 kilocycle pulses 195.

At $t_3$ when AND GATE 134 is disabled, no further local oscillator signal pulses 188 are transmitted to the dividers. Thus, at $t_4$ and $t_5$ when Pulses 188 would normally switch back and forth between zero and the plus value, the collector voltage of Transistor 165 stays positive. Therefore, the next positive going edge of local oscillator pulse 188 is not available at $t_4$ to switch Flip Flop 45, and the Pulse 195 remains positive. At $t_5$ the AND GATE 134 is still disabled and there is not positive pulse to trigger divider 45 and, correspondingly, no pulse to trigger the 432 kilocycle dividers 46 and 47. Not until after Pulse 152 terminates at $t_6$ does the next local oscillator Pulse 188 at $t_7$ trigger the 864 kilocycle divider and not until $t_8$ does a positive 864 kilocycle pulse trigger the 432 kilocycle divider. It will be noted that during the interval $t_3-t_6$, the 864 kilocycle divider has been prevented from operating. If the AND GATE had not been disabled, the 1728 kilocycles, the 864 kilocycles and the 432 kilocycle dividers would have continued to generate pulse such as it indicated by the dashed pulses in FIGS. 20, 24 and 25. However, by disabling AND GATE 134, the 432 kilocycle divider is not permitted to switch at $t_5$ and the switching is delayed for a half period until $t_8$ thus shifting the phase of the pulse train by 180°. Thus, it can be seen that the phase of the carrier applied to the demodulators has been shifted by 180° in order to achieve the proper retrieval of the data and other characters modulated onto the carrier at the transmitter.

THE DATA RETRIEVING CIRCUIT

Figure 26:
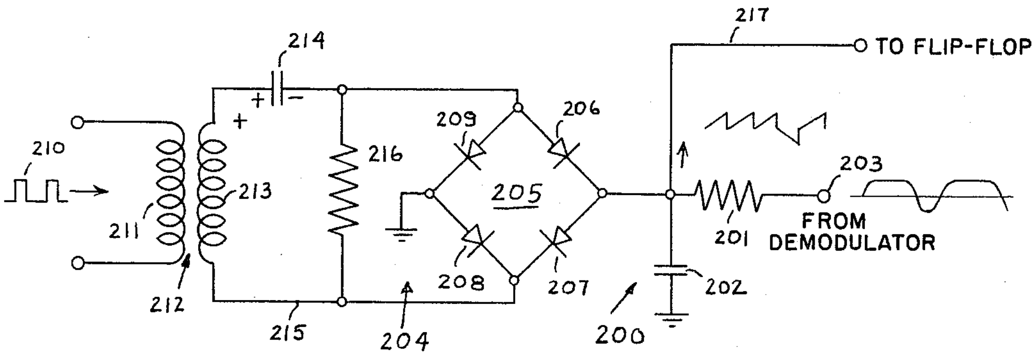
FIG. 26 is a circuit diagram of the data recovery circuit which also forms part of the receiver of FIG. 7.

The data after being demodulated in the "I" and "Q" Channel Demodulators is applied to a Data Retrieval Circuit which reconstitutes the wave form of the signal. That is, in the course of transmission, the binary characters modulated on the carrier have deteriorated badly as to wave form and they are no longer sharp, clean pulses. Therefore, a need exists to reshape these pulses. To this end, network is illustrated in FIG. 26 wherein the deteriorated data is first applied to an Integrating Circuit which produces an output voltage, the magnitude of which is proportional to the average value of the signal and the polarity of which is a function of the type of binary character, i.e., Binary ONE or ZERO. A Switch, associated with the Integrating Circuit, is triggered at the clock pulse rate to discharge the Integrating Circuit. FIG. 26 shows an Integrating Circuit 200 consisting of a Resistance 201 and a Capacitor 202. The signal from the Demodulator is applied to an Input Terminal 203 and charges Capacitor 202 through the resistance to produce a voltage across the capacitance which is proportional to the integrated value of the signal at the input terminal. The junction of Resistor 201 and Capacitor 202 is connected through a balance amplifier, not shown, which senses whether capacitor 202 is positive or negative and steers the input of a Flip Flop which is periodically triggered by the leading edge of the clock pulse. Also connected to the junction of Resistor 201 and Capacitor 202 is a Switch Arrangement 204 which is operated at the clock pulse rate and discharges Capacitor 202 at the clock pulse rate. The switch arrangement consists of a Diode Bridge 205 consisting of Diodes 206–209 connected as the four arms of a bridge. The clock pulses 210 are applied to the Primary Winding 211 of a Transformer 212, the Secondary 213 of which is connected through a Capacitor 214 and a Lead 215 across one diagonal of the bridge. The junction of Diodes 208 and 209, which are adjacent arms of the bridge, are connected to a point of reference potential such as ground, whereas the remaining terminal of the Bridge at the junction of Diodes 206 and 207 is connected to the Integrating Circuit. Upon appearance of Pulse 210, which is generated from the positive leading edge of the clock pulse, the polarity of the voltage across Secondary Winding is illustrated by the plus (+) or minus (−) signs. The junction of Diodes 206 and 209 is positive, and the junction of Diodes 208 and 207 is positive. If the voltage on Capacitor 202 is positive, electron current flows from ground through Diode 209, down through Leak Resistance 216 connected in shunt with the Bridge, through Diode 207 into Capacitor 202 discharging it. If, on the other hand, the voltage on Capacitor 202 is negative, electron current flows from the Capacitor through Diode 206 down through Resistance 216, and through Diode 208 to ground, thereby discharging the Capacitor. Thus, the voltage on Output Lead 217 to Flip Flop is a series of sawtooth voltages, with a period equal to the clock frequency, and the polarity just prior to discharge is utilized to steer the Flip Flop. Capacitor 214 connected in series with the upper terminal of the Secondary Winding 213 not only couples the positive pulse to the Diode Bridge but also back-biases the Diodes during the intervals between Pulses 210 so that the Diode Bridge does not inadvertedly conduct and discharge the Capacitor before the appearance of the pulse. That is, upon the appearance of a clock pulse the current flows through the diodes and charges the Capacitor to the polarity indicated by the plus (+) or minus (−) sign so that these diodes are reverse biased and cannot conduct when the pulse disappears.

Figures 27, 28, 29, 30, 31:
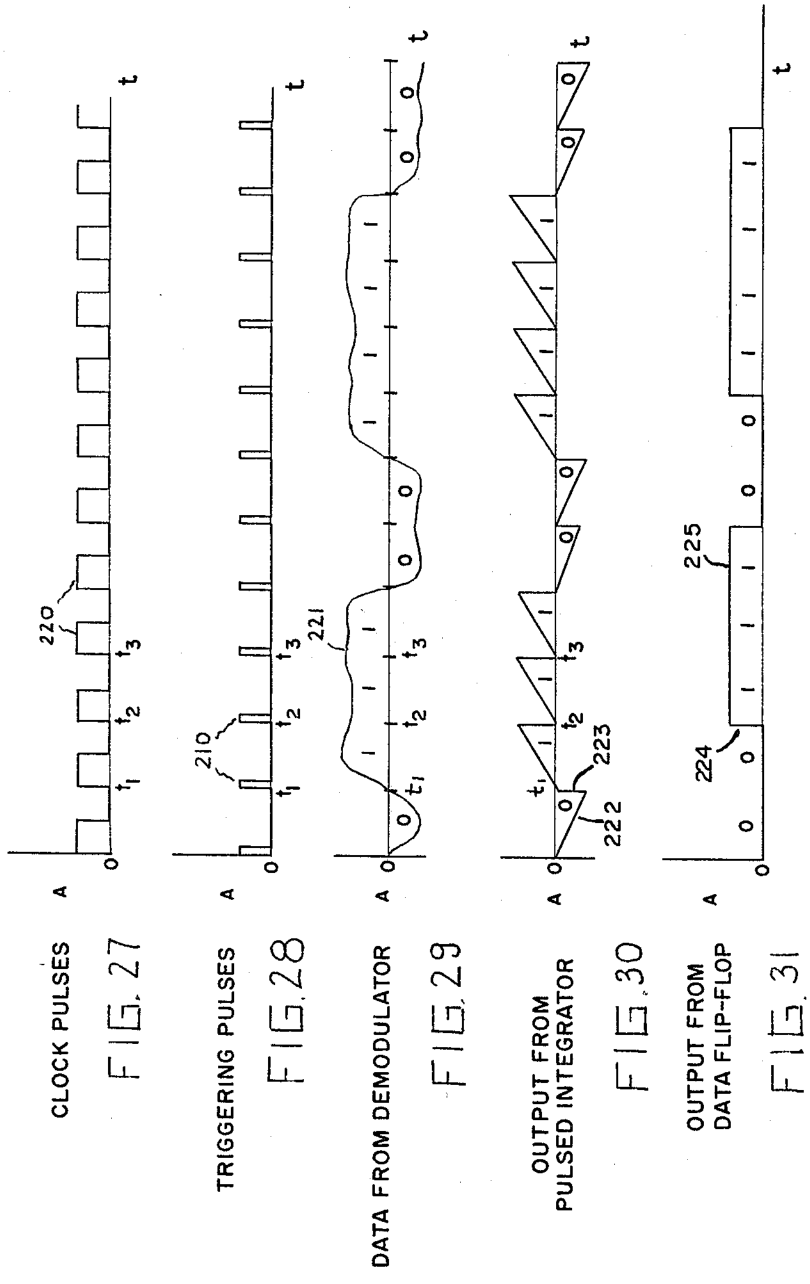
FIGS. 27 through 31 are Wave Form diagrams useful in understanding the manner in which the data recovery network of FIG. 26 functions.

The operational sequence of the Data Recovery Circuit, illustrated in FIG. 26, may best be understood from the wave form illustrated in FIGS. 27–31. FIG. 27 illustrates the Clock Pulse 220 which represents the frequency at which the Integrating Circuit is discharged. These clock pulses may be differentiated to produce the triggering Pulses 210 applied to the primary winding of Transformer 212 of Switch 204. These triggering pulses are generated for each leading edge of the clock pulses which, as previously explained, is the point in time in which the data is read out of the Serial Encoder and which, therefore, represents any transition of the data from one binary character to the other. The signal from the Demodulator, which appears at Input Terminal 203, is illustrated by the Waveform 221 of FIG. 28. As can be seen from observation, the waveform has deteriorated substantially during the course of transmission and demodulation, and it is desired to shape this wave form to produce the desired sharp transitions between the ZERO and ONE states. During the interval between trigger pulses the Signal 221 is applied to the Integrating Circuit and Capacitor 202 charges up to a voltage representative of the average of the input. Thus, for example, during the first negative excursion of the waveform, indicating a Binary ZERO, Capacitor 202 charges through Resistance 201 to a negative value illustrated at 222. At time $t_1$ Triggering Pulse 210 is applied to the Diode Bridge discharging the capacitor. Since $t_1$ represents a zero crossing of the data, the input waveform goes positive during the next time interval and capacitor charges in the positive direction until at time $t_2$ another triggering pulse discharges the capacitor. The same discharge pulse 210 is used to trigger the Flip Flop, the output of which shifts as illustrated by 224 of FIG. 31 since it is steered by the polarity of the integrator voltage prior to discharge. Since the input waveform is still positive, Capacitor 202 again is charged to a value representative of the waveform during the interval from $t_2$ to $t_3$ and is again discharged at time $t_3$. The same sequence is repeated for the waveform, and the waveform is integrated and discharged during each clock pulse and the polarity of the integrated waveforms being utilized to control the state of the Flip Flop to produce the desired character zero crossings representatiive of changes between bits.

It will be noted from FIGS. 37 and 38 that there is one clock pulse delay in reconstituting the data character waveform from the integrator. However, this is of no consequence as long as the proper bit sequence is maintained so that proper synchronisation and framing at the Serial Decoder will retrieve the individual characters.

While a particular embodiment of this invention has been shown, it will, of course, be understood that it is not limited thereto since many modifications both in the circuit arrangement and the devices employed may be made. It is contemplated by the appended claims to cover any such modifications as fall within the true spirit and scope of this invention.

What is claimed as new and desired to be secured by Letters Patent of the United States is:

1. A Communication System for transmitting digital data comprising means to modulate a carrier with data in the form of digital bits and with a tone signal having a repetition rate equal to the data bit rate to produce a double sideband carrier suppressed signal, means to receive said modulated carrier, a demodulator, a local oscillator means to supply a signal at the carrier frequency, said local oscillator being capable of assuming zero and 180° phase positions, means to apply the carrier signal to said demodulator to recover the data bits and the tone signal, means to control the local oscillator means to insure that the zero phase position is maintained, including means to compare the phase of the data bit zero crossings and the phase of the tone signal and to produce, an inhibiting signal for an incorrect phase condition, inhibiting means for said local oscillator means responsive to said inhibiting signal to interrupt application of the signal from the local oscillator for a time sufficient to change the phase of the signal.

2. A Communication System for transmitting digital data comprising means to modulate data in the form of digital bits onto a carrier wave, whereby the phase of the carrier takes one of a number of predetermined phase positions in response to the digital bits to produce a double sideband, suppressed carrier signal, means to modulate a tone signal at the data bit rate onto said carrier, means to receive said double sideband suppressed carrier signal, first and second demodulators, means to apply said received signal to said first and second demodulators, local oscillator means to supply two quadrature signals at the carrier wave frequency to the first and second demodulators, whereby the appearance of a tone signal in the quadrature channel is an indication of a phase deviation, a control loop for said local oscillator for controlling the frequency and phase of said local oscillator to lock the oscillator at the proper frequency and at stable phase positions of either zero or 180°, including tone signal filters coupled to the output of said first and second demodulators to extract any tone signals in the output from said filters, a modulator coupled to output of said filter to produce a control signal in the event a tone signal is present in both channels, the polarity and amplitude of said control signal representing the direction and magnitude of the phase deviation of said local oscillator signal from the stable zero or 180° phase positions, phase ambiguity detecting and correcting means for detecting whether said local oscillator signal has assumed the zero or 180° phase stability position including means coupled to the output of the in-phase demodulator for comparing the relative phase of the data bit zero crossings and the tone signals, means to generate an error signal if the relative phases of the data bit zero crossings and the tone signals indicate the local oscillator has assumed the 180° stable phase position, means responsive to said error signal for inhibiting the application of the local oscillator signal for a fixed period sufficient to reverse its phase 180°.

3. In a Communication Sytem for transmitting digital data comprising means for simultaneously modulating a carrier with data in the form of digital bits and with a tone signal having a repetition rate equal to the data bit rate to produce a double sideband, carrier suppressed signal, means to receive said modulated carrier, a demodulating means, a local oscillator means to supply a signal at carrier frequency, said local oscillator signal assuming either a zero or one hundred and eighty degree phase position with respect to the phase needed to insure proper data recovery, means to apply the carrier signal to said demodulating means to recover the data bits and the tone signal, inhibiting means for interrupting the application of the carrier signal to said demodulating means, means to compare the phase of the recovered tone signal and the zero crossing of the data bits to determine whether the local oscillator signal is in the zero phase position and to produce an inhibiting signal for said inhibiting means if it is not, said means including first pulse generating means to produce pulses in response to each zero crossing of said data bits, means to apply said zero crossing pulses and tone signals to an electrically controlled switch means to produce an output signal of a given polarity only if the polarities of the zero crossing pulses and the tone signal have a predetermined relationship, means to trigger a second pulse generating means in response to said output signal of the given polarity, said last named pulse generating means producing an inhibiting pulse for said inhibiting means to interrupt application of the carrier signal to the demodulator for a period sufficient to reverse the phase of the local oscillator signal one hundred and eighty degrees.

4. The Communication System, according to claim 3, wherein said first pulse generating means includes a Schmitt Trigger.

5. The Communication System, according to claim 4, wherein said switch means is a diode bridge and said zero crossing pulses are applied to one diagonal of the bridge and the tone signal to the other.

6. In a Communication System the combination of first and second modulators, local oscillator means to apply carrier signals in quadrature to said modulators, means to apply data bits representing Binary ONES and ZEROES to both of said modulators, a tone signal source for supplying a tone signal having a repetition rate equal to the data bit rate, means to apply the tone signal to one of said modulators, means to add the outputs of said modulators to produce a modulated carrier which assumes one of four possible phase positions, each of the phase positions representing one of the four possible combinations of data bits applied to the modulators, means to receive said modulated carrier, first and second demodulators, means to apply said received signals to both of said demodulators, local oscillator means to apply two carrier frequency signals in quadrature to said demodulators to recover the data bits at both demodulators, means to control the phase of the local oscillator signal including inhibiting means for interrupting the application of the carrier frequency signals from said local oscillator, first pulse generating means coupled to one of said demodulators for producing pulses in response to each zero crossing of the recovered data bits, means to apply said zero crossing pulses and the recovered tone signal to a diode bridge to produce an output signal of a given polarity if the polarities of the zero crossing pulses and the tone signals bear a predetermined relationship, means to utilize said output signal to inhibit said inhibiting means to interrupt application of the carrier signals for a sufficient time to reverse their phase.

7. The Communication System, according to claim 6, wherein said first pulse generating means includes a Schmitt Trigger.

8. The Communication System, according to claim 7, wherein said output signal from said diode bridge triggers a second pulse generating means to produce an inhibiting signal.

9. In a receiver for receiving data in the form of digital bits and a tone signal modulated onto a carrier, the combination comprising first and second demodulating means, means to apply the received signals to the first and second demodulators, local oscillator means for generating signals at the carrier frequency, means to apply said signals in quadrature to said first and second modulators to recover the binary bits at the output of both said first and second modulators and the tone signal at said first modulator, means to phase lock said local oscillator means, including means to compare the relative phases of the recovered data bits and the tone signals as a measure of the local oscillator phase, said last named comparing means including means to generate a pulse in response to each zero crossing of the data bits, means to apply said zero crossing pulses and said tone signals to a sampling means, whereby a control signal of a given polarity is produced whenever the polarity of the tone signal and the zero crossing pulse is such as to indicate that said local oscillator is not properly phase locked, means to interrupt application of said carrier signal to said first and second demodulators in response to said control signal for a period sufficient to reverse the phase of the carrier signal applied to said demodulator.

10. The Receiver, according to claim 9, wherein said means to generate said zero crossing pulses includes a Schmitt Trigger.

11. The Receiver, according to claim 10, wherein said means to interrupt the carrier signals includes gate means having said carrier signals impressed thereon and which is inhibited in response to said control signal to interrupt said carrier signal.

References Cited by the Examiner

UNITED STATES PATENTS

| | | | |
|---|---|---|---|
| 2,977,417 | 3/1961 | Doeltz et al. | 178—66 X |
| 3,063,017 | 11/1962 | Lehan et al. | 328—55 |
| 3,123,670 | 3/1964 | Kaenel | 178—66 |
| 3,189,826 | 6/1965 | Mitchell et al. | 325—320 X |

DAVID G. REDINBAUGH, *Primary Examiner.*

J. T. STRATMAN, *Assistant Examiner.*